United States Patent Office 3,367,915
Patented Feb. 6, 1968

3,367,915
HOMOPOLYMER OF 2-METH-
ACRYLOXYTROPONE
Lorraine Guy Donaruma, Potsdam, N.Y., assignor to Research Corporation, New York, N.Y., a corporation of New York
No Drawing. Filed Aug. 2, 1965, Ser. No. 476,713
1 Claim. (Cl. 260—63)

ABSTRACT OF THE DISCLOSURE

A homopolymer having anti-bacterial activity is obtained by the free radical polymerization of 2-methacryloxy tropone.

This invention relates to tropolone compositions. In one specific aspect, it relates to homopolymerized methacrylate esters of tropolones.

The seven-membered ring compound 2,4,6 - cycloheptatrien-2-ol-1-one, better known as tropolone, is representative of a class of compounds known as the tropolones. These compounds exhibit quasi-aromatic activity and undergo nuclear substitution in a manner somewhat analogous to phenol. Thus, the tropolone nucleus can be chlorinated, brominated, nitrated, sulfonated, formylated, nitrosated and diazo-coupled, usually in the gamma or 5-position. Conventional conversions yield the corresponding iodo, amino, hydrazino, acylamino, mercapto, hydroxy, alkoxy, cyano and carboxylic acid derivatives.

While the carbonyl group of tropolone compounds resists normal ketone reactions, the hydroxyl group undergoes acylation and can be esterified, for example, with methacrylyl halides. The resultant methacrylate esters, due to the conjugated unsaturation present in the molecule, are capable of being homopolymerized.

It is an object of the present invention to provide a new class of homopolymerized tropolone methacrylate esters useful as anti-bacterials and for other purposes.

The resultant 2 - methacryloxytropones are homopositions which may be characterized as homopolymers of tropolone methacrylates or homopolymerized 2-methacryloxytropones.

The methacrylate ester intermediates for use in making the polymeric composition of the present invention are most conveniently prepared by the reaction of a methacrylyl halide such as methacrylyl chloride with the corresponding tropolone compound as its sodium or potassium salt. Preferably, the acylation is effected under anhydrous conditions and in the presence of a solvent. Pyridine is particularly suitable for use as the solvent or in conjunction with an aromatic hydrocarbon solvent.

The resultant 2 - methacryloxytropones are homopolymerized by the customary techniques applicable to the free radical initiated polymerization of methacrylate esters generally. The most commonly employed free radical initiators are diazo compounds and acyl peroxides such as benzoyl peroxide. The 2 - methacryloxytropones may be homopolymerized by adding the initiator to molten monomer, or to the monomer dissolved or suspended in a suitable solvent.

My invention is further illustrated by the following examples showing the preparation of representative compositions according to the present invention.

Example 1

To a three necked flask equipped with a stirrer and a condenser, was added 10 grams (0.083 mole) of tropolone, 0.10 gram of hydroquinone, 14.0 grams of dry pyridine, and 150 milliliters of dry benzene. The air in the flask was replaced by nitrogen and 8.52 grams (0.083 mole) of methacrylyl chloride was added dropwise with vigorous stirring. Stirring was continued for one hour after the addition of methacrylyl chloride was complete. The reaction mixture was washed successively with water, dilute hydrochloric acid, water, and finally dried over anhydrous calcium chloride. The benzene was evaporated off leaving a white solid. Recrystallization from hexane gave 12.4 grams or a 65% yield of 2 - methacryloxytropone as white needles, M.P. 78–79° C.

*Analysis.*—Calculated for $C_{11}H_{10}O_3$: C, 69.49; H, 5.29. Found: C, 69.71; H, 5.16.

Example 2

Five grams (0.026 mole) of 2 - methacryloxytropone was added to a tube which was immersed in an oil bath at 100° C. Nitrogen was bubbled through the melted monomer in the tube for 15 minutes and then 10 milligrams of benzoyl peroxide was added. After ten to fifteen minutes, the melted monomer began to thicken. When movement of the nitrogen bubbles stopped, the tube was removed from the oil bath and cooled. The resultant poly-(2 - methacryloxytropone) was pulverized and extracted with acetone to remove any unreacted monomer. A 90% yield (4.5 grams) was obtained from the reaction. The polymer was insoluble in conventional solvents and darkened when heated above 200° C.

Infrared data (cm.$^{-1}$): 800m, 850w, 885w, 965w, 1060s, 1090s, 1150s, 1230m, 1270m, 1405m, 1485m, 1520m, 1600s, 1620s, 1650s, 1760s, 2990w, 3480w, wherein s=strong absorbance, m=medium absorbance, and w=weak absorbance.

Example 3

Three grams (0.01 mole) of 2 - methacryloxytropone was dissolved in 20 milliliters of benzene and refluxed under a nitrogen atmosphere. After refluxing for thirty minutes, 6 milligrams of benzoyl peroxide was added and refluxing was continued for one hour. The reaction mixture was then added to acetone causing precipitation of the polymer. A yield of 0.30 gram (10%) of poly-(2-methacryloxytropone) was obtained. The infrared spectrum was identical with the polymer obtained by melt polymerization. The solubility properties of the product did not differ from that obtained by solution polymerization.

It has been established by screening representative compositions against various test organisms that the polymeric compositions of the present invention exhibit anti-bacterial activity. It will be appreciated that these compositions may differ in their anti-bacterial effects and degree of activity against various microorganisms.

In the following experiment, poly-(2 - methacryloxytropone) was screened against five bacteria by the agar plate technique of U.S.D.A. Circular No. 198 (1931). In each case the width of the zone of inhibition was measured. In the table below, the results of tests giving zones of inhibition below 10 millimeters are classified as weak, and those giving zones between 10 and 20 as strong.

| Test culture: | Degree of inhibition |
|---|---|
| *S. aureus* | strong |
| *S. typhosa* | weak |
| *S. cholerasius* | weak |
| *E. coli* | strong |
| *S. pyogenes* | strong |

In addition to their to their anti-bacterial activity, certain of the compositions of the present invention exhibit antineoplastic activity in standard tissue culture screening tests. Results obtained with poly-(2 - methacryloxy-tropone) are summarized below:

| Screening Run | $ED_{50}$ | Slope |
|---|---|---|
| 1 | 2.8 | −0.75 |
| 2 | 2.2 | −0.86 |
| 3 | 4.1 | −0.93 |

The $ED_{50}$ is given in micrograms per milliliter.

I claim:
1. A homopolymer obtained by the free radical polymerization of 2-methacryloxytropone.

No references cited.

WILLIAM H. SHORT, *Primary Examiner.*

L. LEE, *Assistant Examiner.*